(12) United States Patent
Tubbs

(10) Patent No.: US 8,090,756 B2
(45) Date of Patent: Jan. 3, 2012

(54) METHOD AND APPARATUS FOR GENERATING TRIGONOMETRIC RESULTS

(75) Inventor: Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1374 days.

(21) Appl. No.: 11/668,040

(22) Filed: Jan. 29, 2007

(65) Prior Publication Data

US 2008/0183783 A1 Jul. 31, 2008

(51) Int. Cl.
*G06F 7/38* (2006.01)
(52) U.S. Cl. .................... 708/276; 708/440
(58) Field of Classification Search ............ 708/276, 708/440
See application file for complete search history.

(56) References Cited

U.S. PATENT DOCUMENTS

| | | | | |
|---|---|---|---|---|
| 4,159,527 | A * | 6/1979 | Yahata et al. | 708/276 |
| 5,276,633 | A * | 1/1994 | Fox et al. | 708/276 |
| 6,330,578 | B1 * | 12/2001 | Savin et al. | 708/270 |
| 6,981,011 | B1 | 12/2005 | Napilitano | |
| 2002/0184274 | A1 * | 12/2002 | Shipley | 708/276 |

* cited by examiner

*Primary Examiner* — Chuong D Ngo
(74) *Attorney, Agent, or Firm* — Patterson & Sheridan LLP

(57) ABSTRACT

A method, computer-readable medium, and apparatus for generating a trigonometric value. The method includes receiving a request to calculate a trigonometric value for an angle value and calculating a fractional value from the angle value. The fractional value corresponds to one of a first quadrant value, a second quadrant value, a third quadrant value, and a fourth quadrant value. The method also includes using the fractional value to determine whether to perform at least one of inverting the fractional value and negating the trigonometric value. The method further includes generating the trigonometric value from the fractional value by adding at least a portion of the fractional value with at least one of a shifted fractional value produced by shifting the portion of the fractional value and a constant value and providing the trigonometric value in response to the request.

21 Claims, 8 Drawing Sheets

METHOD AND APPARATUS FOR GENERATING TRIGONOMETRIC RESULTS

BACKGROUND OF THE INVENTION

1. Field of the Invention

The present invention generally relates to performing calculations in a processor.

2. Description of the Related Art

Modern computer systems are typically capable of executing a wide variety of programs which perform various calculations at high speed. For example, a computer system may be configured to execute a video game in which a series of three-dimensional images (frames) is rapidly generated in a process referred to as rendering. The frames may then be displayed one after the other in quick succession, thereby producing an impression of motion. The video game may also be configured to perform physics simulations to simulate the result of actions being performed by a player of the video game.

One of the types of calculations performed during rendering may include a trigonometric calculation. For example, trigonometric calculations may be performed during shading operations to determine an angle at which light from a light source reflects off of a surface. Trigonometric calculations may also be performed where the video game performs physics simulations such as simulations of physical collisions between two objects. Such trigonometric calculations may also be performed by other programs in addition to video games, such as rendering or graphics programs.

Typically, in order to improve the quality of programs which perform high speed rendering and physics simulations, there may be a desire to improve the speed at which trigonometric calculations are performed. By increasing the speed at which the trigonometric calculations are performed, a program rendering three-dimensional scenes may provide increased detail with respect to a program which is limited to performing slower trigonometric calculations. Similarly, a program which is able to perform trigonometric calculations more quickly may perform more numerous physics simulations of greater accuracy than a program which is limited to performing slower trigonometric calculations.

Accordingly, what is needed are an improved method, computer-readable medium, and apparatus for generating trigonometric results of a trigonometric calculation.

SUMMARY OF THE INVENTION

The present invention generally provides a method, computer-readable medium, and apparatus for generating a trigonometric value. In one embodiment, the method includes receiving a request to calculate a trigonometric value for an angle value and calculating a fractional value from the angle value. The fractional value corresponds to one of a first quadrant value, a second quadrant value, a third quadrant value, and a fourth quadrant value. The method also includes using the fractional value to determine whether to perform at least one of inverting the fractional value and negating the trigonometric value. The method further includes generating the trigonometric value from the fractional value by adding at least a portion of the fractional value with at least one of a shifted fractional value produced by shifting the portion of the fractional value and a constant value and providing the trigonometric value in response to the request.

One embodiment of the invention also provides a computer-readable storage medium including instructions, which, when executed by a processor, are configured to perform an operation. The operation includes receiving a request to calculate a trigonometric value for an angle value and calculating a fractional value from the angle value. The fractional value corresponds to one of a first quadrant value, a second quadrant value, a third quadrant value, and a fourth quadrant value. The operation further includes using the fractional value to determine whether to perform at least one of inverting the fractional value and negating the trigonometric value. The operation also includes generating the trigonometric value from the fractional value by adding at least a portion of the fractional value with at least one of a shifted fractional value produced by shifting the portion of the fractional value and a constant value and providing the trigonometric value in response to the request.

One embodiment of the invention also provides a computer system include a computer-readable storage medium including one or more instructions and a processor comprising circuitry, which, when executing the one or more instructions, is configured to receive a request to calculate a trigonometric value for an angle value and calculate a fractional value from the angle value. The fractional value corresponds to one of a first quadrant value, a second quadrant value, a third quadrant value, and a fourth quadrant value. The circuitry is also configured to use the fractional value to determine whether to perform at least one of inverting the fractional value and negating the trigonometric value. The circuitry is further configured to generate the trigonometric value from the fractional value by adding at least a portion of the fractional value with at least one of a shifted fractional value produced by shifting the portion of the fractional value and a constant value and provide the trigonometric value in response to the request.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
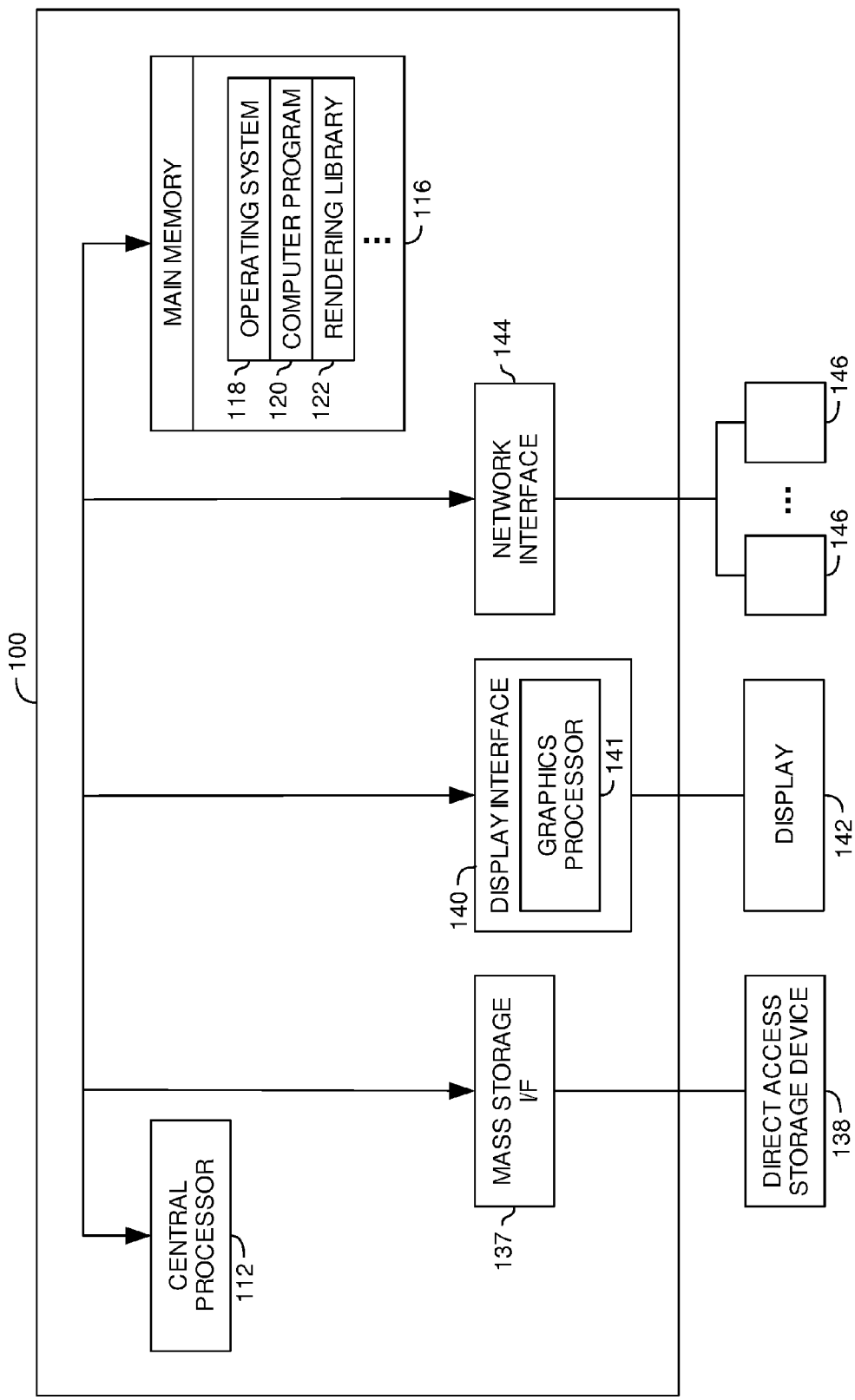
FIG. 1 is a block diagram depicting a computer system according to one embodiment of the invention.

The present invention generally provides a method, computer-readable medium, and apparatus for generating a trigonometric value. In one embodiment, the method includes receiving a request to calculate a trigonometric value for an angle value and calculating a fractional value from the angle value. The fractional value corresponds to one of a first quadrant value, a second quadrant value, a third quadrant value, and a fourth quadrant value. The method also includes using the fractional value to determine whether perform at least one of inverting the fractional value and negating the trigonometric value. The method further includes generating the trigonometric value from the fractional value by adding at least a portion of the fractional value with at least one of a shifted fractional value produced by shifting the portion of the fractional value and a constant value and providing the trigonometric value in response to the request.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

System Overview

A particular system for implementing the present embodiments is described with reference to FIG. 1. However, those skilled in the art will appreciate that embodiments may be practiced with any variety of computer system configurations including hand-held devices, multiprocessor systems, microprocessor-based or programmable consumer electronics, minicomputers, mainframe computers and the like. The embodiment may also be practiced in distributed computing environments where tasks are performed by remote processing devices that are linked through a communications network. In a distributed computing environment, program modules may be located in both local and remote memory storage devices.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

FIG. 1 depicts a computer system 100 according to one embodiment of the present invention. For purposes of the invention, computer system 100 may represent any type of computer, computer system or other programmable electronic device, including a client computer, a server computer, a portable computer, an embedded controller, a video game console, etc. The computer system 100 may be a standalone device or networked into a larger system.

The computer system 100 may include a mass storage interface (I/F) 137 operably connected to a direct access storage device 138, a display interface 140 operably connected to a display 142, and a network interface 144 operably connected to a plurality of networked devices 146. The display interface 140 may include a graphics processor 141. The display 142 may be any video output device for outputting a user interface. The networked devices 146 could be desktop or PC-based computers, workstations, network terminals, or other networked computer systems. The computer system 100 may also include at least one central processor 112, which obtains instructions, or operation codes, (also known as opcodes) and data via a bus 114 from a main memory 116. The processor 112 could be any processor adapted to support the methods, apparatus and article of manufacture of the invention.

The main memory 116 could be one or a combination of memory devices, including Random Access Memory, non-volatile or backup memory (e.g., programmable or Flash memories, read-only memories, etc.). In addition, memory 116 may be considered to include memory physically located elsewhere in a computer system 100, for example, any storage capacity used as virtual memory or stored on a mass storage device or on another computer coupled to the computer system 100 via bus 114. The main memory 116 may include an operating system 118, a computer program 120, and a rendering library 122 which may be used to render graphics and perform other calculations for the computer program 120.

Figure 2:
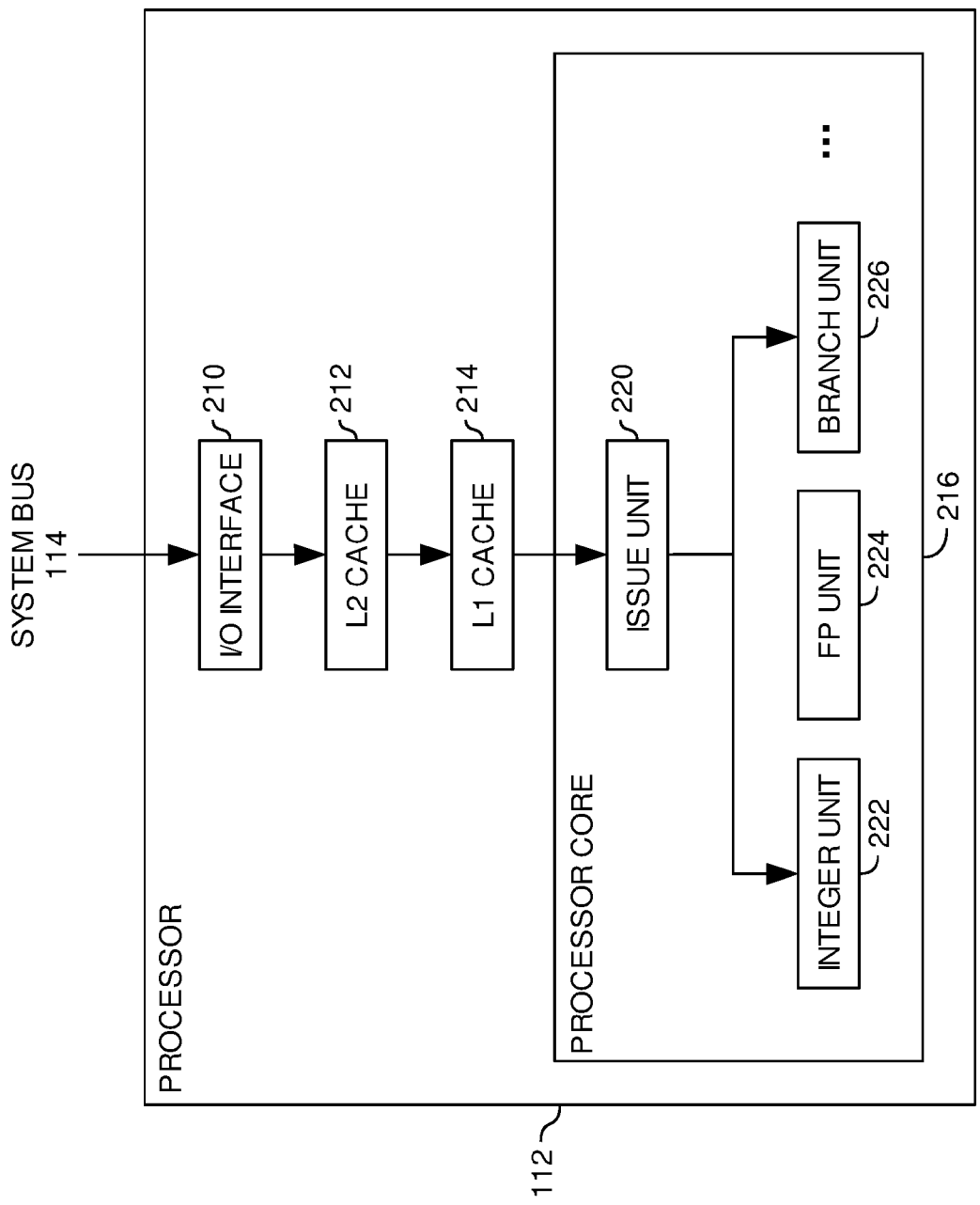
FIG. 2 is a block diagram depicting a processor according to one embodiment of the invention.

FIG. 2 is a block diagram depicting a processor 112 according to one embodiment of the invention. The processor 112 may include an input/output (I/O) interface 210 which sends and receives data via the system bus 114. The processor 112 may store a portion of the data being used by programs executed by the processor 112 in an L1 cache 214 and/or an L2 cache 212. Instructions executed by the processor 112 may be executed in a processor core 216 which may include an issue unit 220 for issuing instructions, an integer unit 222 for performing integer calculations, a floating point (FP) unit 224 for performing floating point calculations, a branch unit 226 for executing branch instructions, as well as other execution units. While described herein with respect to a single central processor 112 with a single processor core 216, embodiments of the invention may be utilized with any number of processors having one, two, or more processor cores 216.

Generating a Trigonometric Value

Embodiments of the invention provide a method, computer-readable medium, and apparatus for generating a trigonometric value, for example, for a sine calculation operation or a cosine calculation operation. As described below, embodiments may generate the trigonometric value by estimating the trigonometric value using a received angle value. In one embodiment, by performing the estimation as described below, the trigonometric value may be obtained more quickly than other slower software methods for generating the trigonometric value and with less hardware overhead than processors which utilize large lookup tables to generate the trigonometric value.

In one embodiment, generating an estimated trigonometric value may be used by programs (e.g., program 120 and/or rendering library 122) in which obtaining the trigonometric value quickly is desired and where increased accuracy is optional. For example, embodiments of the invention may be used for fast rendering operations in programs such as video games. During the rendering operations, the estimated trigonometric value may be used for pixel shading, vertex shading, and/or generating procedural textures. Results of the rendering operations may then be displayed to a user, for example, using display 142. During such operations, any difference between the estimated trigonometric value and a trigonometric value with increased accuracy may remain unnoticeable to the human eye. However, it is noted that embodiments of the invention may be used as an alternative to and/or in addition to slower software methods and hardware methods which utilize large lookup tables to produce trigonometric values of increased and/or decreased accuracy. Furthermore, embodiments of the invention may be utilized with any type of integrated circuit including the central processor 112 and/or the graphics processor 141 described above.

Figure 3:
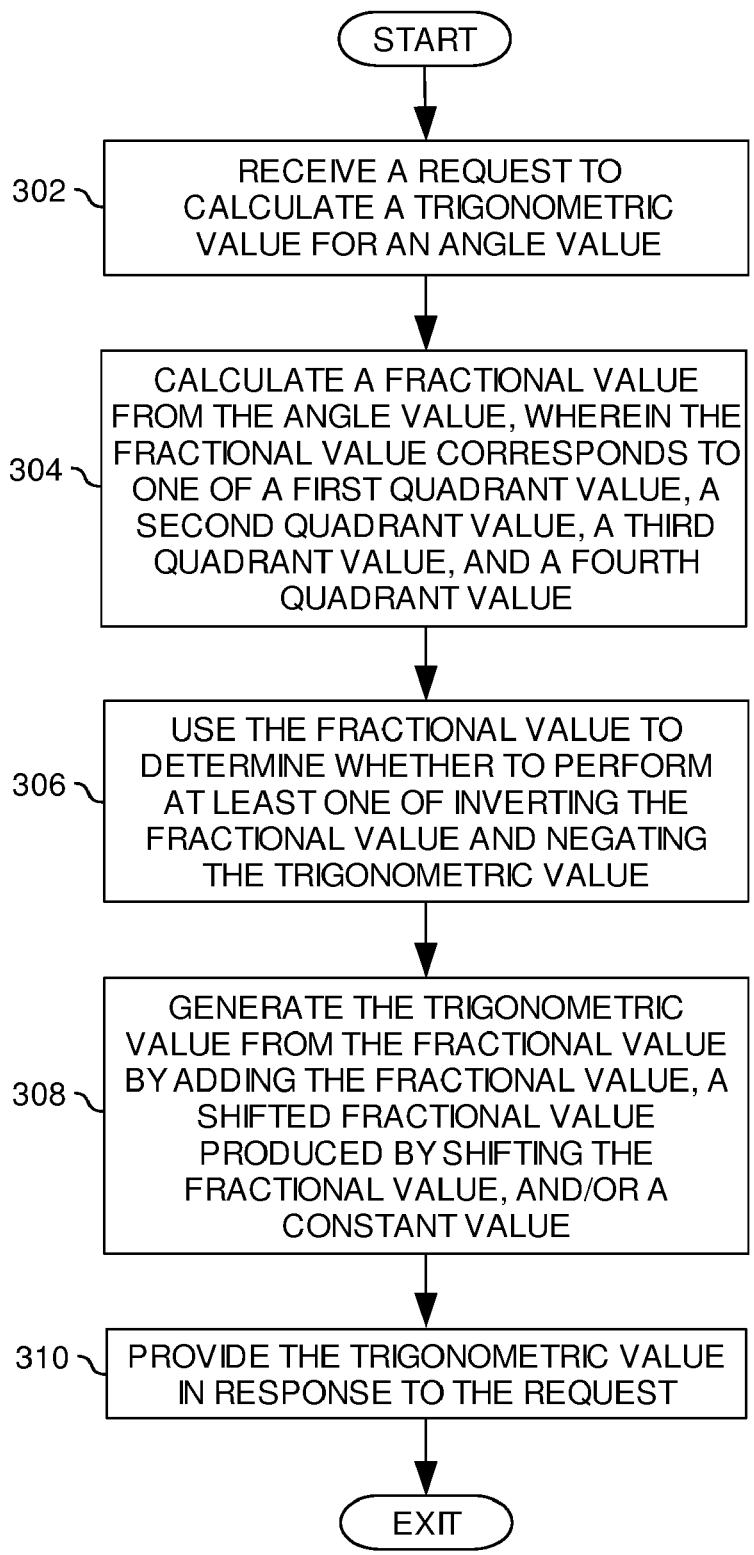
FIGS. 3 and 4A-B are flow diagrams depicting processes for generating a trigonometric value according to one embodiment of the invention.

FIG. 3 is a block diagram depicting a process 300 for generating a trigonometric value according to one embodiment of the invention. As depicted, the process 300 may begin at step 302 where a request to calculate a trigonometric value for an angle value is received. For example, the request may be an instruction executed by the processor 112 as part of the computer program 120 or rendering library 122. The instruction may include, for example, a sine calculation instruction for the angle value or a cosine calculation instruction for the angle value.

Figure 5:
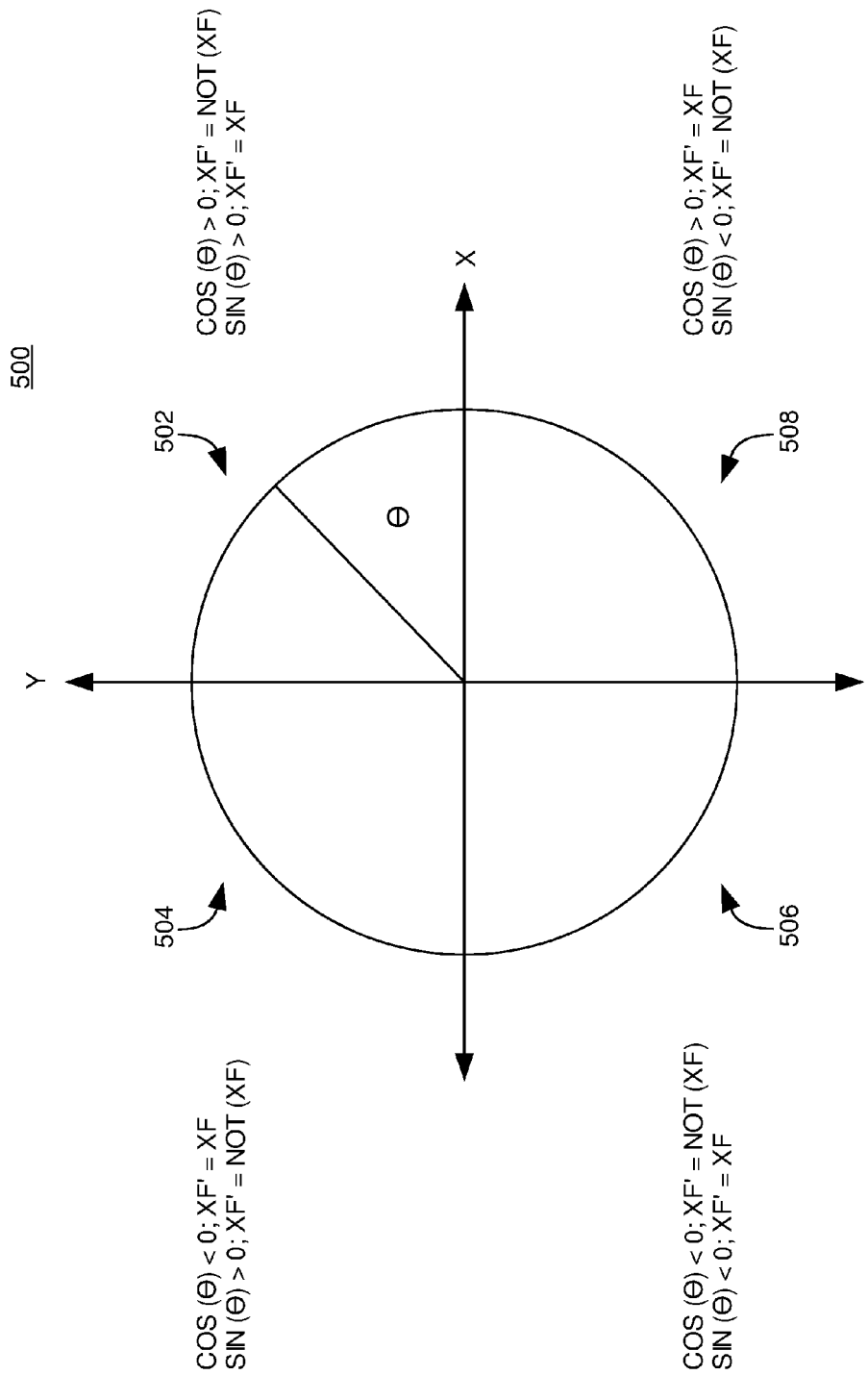
FIG. 5 is a block diagram depicting a unit circle according to one embodiment of the invention.

At step 304 a fractional value may be calculated from the angle value. The fractional value may correspond to one of a first quadrant value, a second quadrant value, a third quadrant value, and a fourth quadrant value. For example, as depicted in FIG. 5, the fractional value may correspond to one quadrant 502, 504, 506, 508 of a unit circle 500. As used herein, the terms first quadrant, second quadrant, third quadrant, and fourth quadrant are merely nominal, and may refer to any one quadrant of the unit circle 500. In one embodiment, if the received angle value ($\theta$) is in radians, the angle value may be divided by a constant value of two multiplied by pi ($\theta/2\pi$, or, equivalently, the angle value may be multiplied by a constant value of $1/2\pi$). Optionally, if the received angle value is in degrees, the angle value may be divided by a constant value of 360 degrees (or, equivalently, the angle value may be multiplied by a constant value of $1/360$). In either case, the result of the division may include an integer value (e.g., if the angle value is greater than $2\pi$ radians or 360 degrees) and the fractional value which indicates a quadrant of the unit circle in which the angle value lies.

At step 306, the fraction value may be used to determine whether perform at least one of inverting the fractional value and negating the trigonometric value. For example, as depicted in FIG. 5, if the fractional value (XF) falls in the first quadrant 502 and the operation being performed is a cosine operation, then the resulting trigonometric value may be positive ($\cos(\theta) > 0$) and the fractional value may be inverted (XF'=NOT(XF)). As another example, if the operation being performed is a sine operation and the fractional value falls in the third quadrant 506, the resulting trigonometric value may be negative ($\sin(\theta) < 0$) and the fractional value may not be inverted (XF'=XF). In one embodiment, negating the trigonometric value may be performed by setting the sign bit of the trigonometric value after the trigonometric value has been generated as described below.

At step 308, the trigonometric value may be generated from the fractional value by adding the fractional value, a shifted fractional value produced by shifting the fractional value, and/or a constant value. The shifted fractional value may also be inverted before addition or may be added after shifting without inversion. As described below, a portion of the fractional value may be used to indicate whether to add the shifted fractional value and/or a given constant value to obtain an approximation of the correct result of the trigonometric operation being performed. In some cases, to improve to the approximation provided by the generated trigonometric value, additional shifted fractional values may also be added to generate the trigonometric value. At step 310, the trigonometric value may be provided in response to the request. As described above, the trigonometric value may be used, for example, during rendering operations for pixel shading, vertex shading, and/or generating procedural textures. The trigonometric value may also be used to perform physics calculations. Results of the rendering operations and/or physics calculations may then be displayed as a rendered image to a user, for example, using display 142.

Figure 4A:
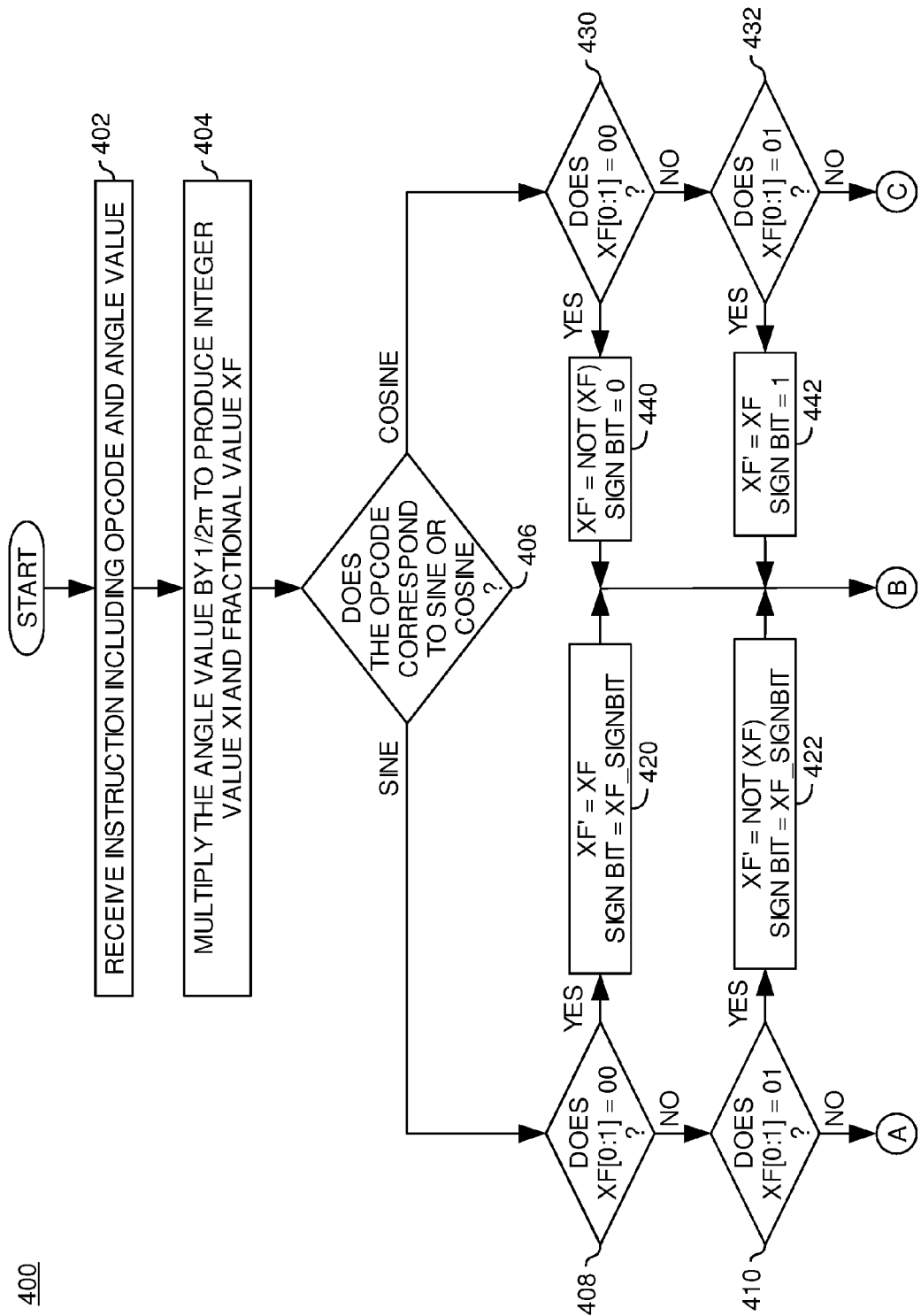
Figure 4B:
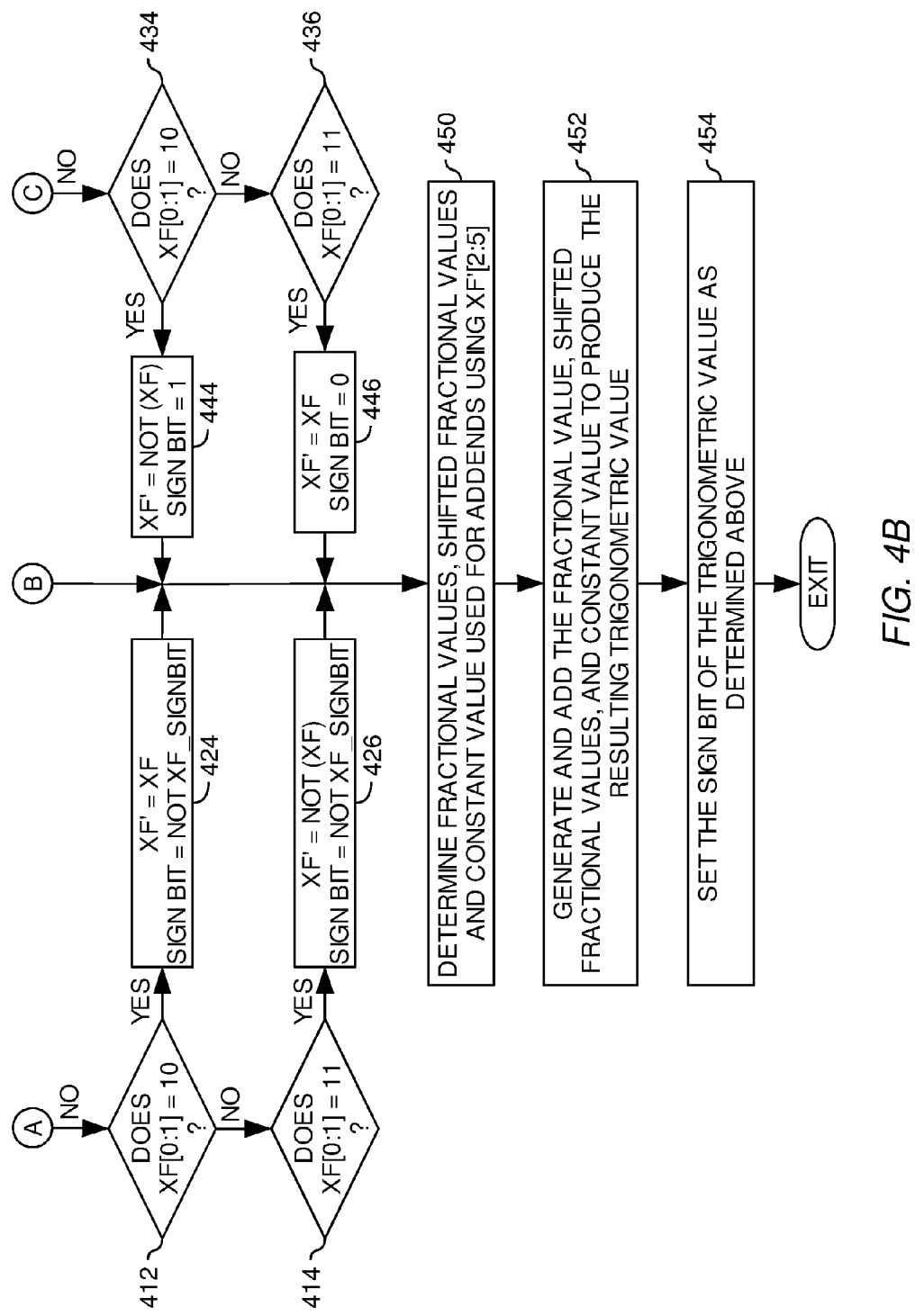

In general, the steps described above with respect to FIG. 3 for generating the trigonometric value may be performed in any appropriate order and with any desired accuracy (e.g., in the number of bits of the angle value, fractional value, and trigonometric value). For example, FIGS. 4A-B are flow diagrams depicting a process 400 for generating the trigonometric value according to one embodiment of the invention. When compared with completely accurate results of the trigonometric operation being performed (e.g., generated using much slower and computational-intensive methods or larger, more expensive hardware lookup tables), the method 400 described below may provide an absolute error of less than $1/360$.

In one embodiment, the method 400 begins at step 402 where an instruction including an opcode and an angle value is received. At step 404, the angle value may be multiplied by a constant value of $1/2\pi$ to provide an integer value XI and a fractional value XF. As described above, the fractional value may correspond to one of the quadrants 502, 504, 506, 508 of the unit circle 500. In one embodiment, the fractional value XF may be a 14-bit binary number, XF[0:13] with a separate sign bit.

At step 406, a determination may be made of whether the opcode corresponds to a sine operation or cosine operation.

As described above with respect to FIG. 5, and as depicted below in Table 1, the type of trigonometric operation may be used to determine whether to invert the fractional value XF (thereby producing XF') and also to determine the sign bit for the generated trigonometric value.

TABLE 1

Determining Inversion of XF and Sign Bit of Result

| Operand | XF[0:1] | Quadrant | XF' | Sign Bit |
|---|---|---|---|---|
| Sine | 00 | $(0 \leq \theta < \pi/2)$ | XF | XF_Signbit |
| Sine | 01 | $(\pi/2 \leq \theta < \pi)$ | NOT(XF) | XF_Signbit |
| Sine | 10 | $(\pi \leq \theta < 3\pi/2)$ | XF | NOT XF_Signbit |
| Sine | 11 | $(3\pi/2 \leq \theta < 2\pi)$ | NOT(XF) | NOT XF_Signbit |
| Cosine | 00 | $(0 \leq \theta < \pi/2)$ | NOT(XF) | 0 |
| Cosine | 01 | $(\pi/2 \leq \theta < \pi)$ | XF | 1 |
| Cosine | 10 | $(\pi \leq \theta < 3\pi/2)$ | NOT(XF) | 1 |
| Cosine | 11 | $(3\pi/2 \leq \theta < 2\pi)$ | XF | 0 |

In one embodiment, the first two bits of the fractional value XF[0:1] may be used to determine which quadrant the angle value is in. Thus, by examining both the type of opcode and the also first two bits of XF, a complete determination may be made of whether to invert XF and of the sign bit for the generated trigonometric value. Accordingly, as depicted with respect to steps 408-414 and steps 430-436 (for sine and cosine operations, respectively), XF[0:1] may be examined to determine which quadrant 502, 504, 506, 508 the angle value lies within. Then, at steps 420-426 and steps 440-446 (corresponding to the entries depicted above in Table 1), the fractional value XF may be inverted where indicated and the sign bit for the generated trigonometric value may be established.

As mentioned above, in one embodiment, the trigonometric value may be generated from the fractional value by adding the fractional value with at least one of a shifted fractional value produced by shifting the fractional value and a constant value. For example, as depicted in Table 2, a portion of the fractional value XF[2:5] may be examined to determine which 1/16 segment of the quadrant of the unit circle 500 the angle value lies within. Based on the determined segment, the appropriate addends for generating the trigonometric value may be established. In some cases, the selected addends may include a portion of the fractional value XF[2:13] (depicted under column ADD1), the portion of the fractional value XF[2:13] shifted to the right by one, two, three, four, or five bits (S1, S2, S3, S4, S5, depicted under columns ADD2 and ADD3), and a constant (depicted under the column ADD4). In some cases, as depicted by the caret symbol ("^", e.g., ^S1, ^S2, ^S3, ^S4), the shifted fractional value may also be inverted before addition. Also, in some cases, as indicated by the blank entries in Table 2, fewer than four addends may be used to generate the trigonometric value.

TABLE 2

Determining the Addends for Generating the Result

| XF'[2:5] | ADD1 | ADD2 | ADD3 | ADD4 |
|---|---|---|---|---|
| 0000 | XF'[2:13] | S1 | S4 | |
| 0001 | XF'[2:13] | S1 | S4 | |
| 0010 | XF'[2:13] | S1 | S4 | |
| 0011 | XF'[2:13] | S1 | S5 | 0000000010 |
| 0100 | XF'[2:13] | S2 | S3 | 0000101001 |
| 0101 | XF'[2:13] | S2 | S4 | 0000011000 |
| 0110 | XF'[2:13] | S2 | S4 | 0001000000 |
| 0111 | XF'[2:13] | S3 | | 0010010011 |
| 1000 | XF'[2:13] | | | 0011010110 |
| 1001 | XF'[2:13] | ^S3 | | 0010100010 |
| 1010 | XF'[2:13] | ^S3 | | 0010100001 |
| 1011 | XF'[2:13] | ^S2 | ^S3 | 0001010001 |
| 1100 | XF'[2:13] | ^S1 | | 0000110010 |
| 1101 | XF'[2:13] | ^S1 | ^S3 | 0000011100 |
| 1110 | XF'[2:13] | ^S1 | ^S2 | 0000001110 |
| 1111 | | | S4 | 1111000000 |

Accordingly, in one embodiment of the invention, XF[2:5] may be used at step 450 to determine (as depicted above in Table 2) the fractional values (ADD1), if any, shifted fractional values (ADD2 and ADD3), if any, and the constant value (ADD4), if any, to be used as addends in generating the trigonometric value. Then, at step 452, the fractional value XF[2:13], shifted fractional values (S1, S2, etc.), and/or the constant value may be generated and added to produce the trigonometric value. At step 454, the sign bit of the trigonometric value may be set as determined with respect to steps 420-426 and 440-446.

As an example, of the process 400 depicted in FIGS. 4A-B, the sine of $\pi/4$ (45 degrees) is approximately 0.70710678, which corresponds to approximately "0.10110101000001" in binary. If an instruction to calculate the sine of $\pi/4$ is received at step 402, then at step 404, the angle value $\pi/4$ may be multiplied by $1/2\pi$ to produce an integer value XI of zero and a fractional value of 1/8 (in binary, XF[0:13]= 0.00100000000000). At step 406, a determination may be made the received opcode corresponds to a sine operation, and at step 408 a determination may be made that XF[0:1] is equal to "00". Accordingly, at step 420, it may be established that XF' should be equal to XF, and that the resulting sign bit should be 0. At step 450, the shifted fractional values and constant value may be determined as described above with respect to Table 2. Here, XF[2:5] is "1000", so the addends are XF[2:13] for ADD1, no addend for ADD2, no addend for ADD3, and a constant value of "0011010110" for ADD4.

At step 452, the addends may be added, in this case, producing the value "0.00110101100000"+"0.100000000000"="0.1011010110 0000". The sign bit may then be set as determined at step 420 to zero (e.g., the result is positive). In comparison with the approximate value provided above of "0.10110101000001, the difference is less than 1/256, thus providing at least eight bit accuracy. Furthermore, while described above with respect to providing eight bit accuracy, embodiments of the invention may be used to provide any desired amount of accuracy. For example, to increase the speed with which the computation is performed, the number of bits of accuracy may be reduced, for example, by reducing the number of segment entries XF[2:5] depicted in Table 2 (e.g., the number of entries could be reduced to eight, using XF[2:4] as a lookup). Similarly, the number and size of the addends could be reduced, for example, by removing the addend column for ADD3 and/or by reducing the number of bits of the constant values used for ADD4. The accuracy of the computation may also be increased, for example, by making corresponding changes to Table 2 for increased segment entries and increased accuracy of the addends.

In one embodiment of the invention, steps of the methods described above may be performed using any conventional processor. For example, each of the steps may be implemented using instructions executed by a conventional processor, with lookup values being stored in conventional processor memory and with determinations described above being performed by the executed instruction. Embodiments of the invention may also be utilized where one or more steps are performed using hardware circuitry designed specifically to carry out the one or more steps. Such hardware circuitry may be used, for example, in addition to conventional processor capabilities to generate the trigonometric value.

The method described above may also be performed by a processor (e.g., central processor 112 or graphics processor 141) configured specifically to execute an instructions for performing the steps described above. The instructions may be referred to, for example, as SINEFP and COSEFP because the instructions may produce an estimated floating point value for the sine and cosine of an angle value indicated by the instructions. In some cases, the instructions may also be executed as part of a vector calculation, for example, VSINEFP and VCOSEFP.

Figure 6:
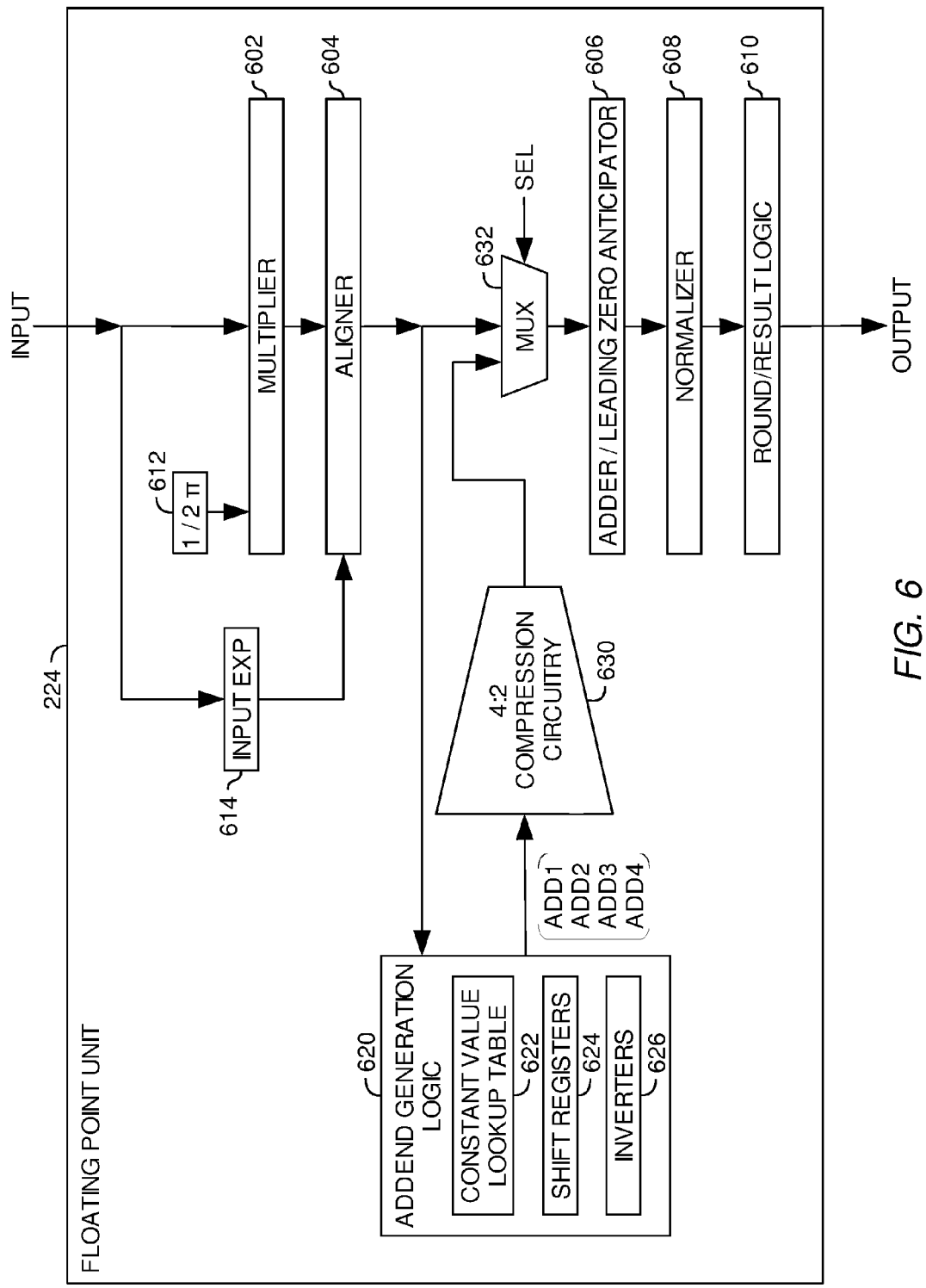
FIG. 6 is a block diagram depicting a floating point unit configured to generate a trigonometric value according to one embodiment of the invention.

In one embodiment of the invention, the pipeline for a floating point unit 224 may be modified to perform the steps described above in manner that provides increased execution performance with minimal additional hardware overhead. For example, FIG. 6 is a block diagram depicting a floating point unit 224 configured to generate a trigonometric value according to one embodiment of the invention. As depicted, the floating point unit 224 may include a multiplier 602, aligner 604, adder and leading zero anticipator 606, normalizer 608, and round and result logic 610.

The multiplier 602 may be configured to multiply two floating point numbers. Thus, for example, the multiplier 602 may be used to multiply the input angle value by a constant value 612 of ½π, thereby producing a floating point result of the multiplication. Optionally, instead of multiplying by ½π, the input may also be multiplied by another constant, thereby scaling the input and providing an additional multiplication in addition to generating the trigonometric result. After the multiplication has been performed, the result of the multiplication may be sent to the aligner 604. The exponent 614 for the input to the aligner 604 such that the aligner 605 aligns the result of the multiplication into an integer value XI and fractional value XF.

In one embodiment, as described above, the integer value XI may be discarded while the fractional value XF may be used to generate the trigonometric result. For example, the fractional value XF may be provided to addend generation logic 620 which may be used to determine the addends (e.g., ADD1, ADD2, ADD3, ADD4) according to the embodiments described above. For example, the addend generation logic 620 may use a constant value lookup table 622 to lookup the constant value addend ADD4. The addend generation logic 620 may also use shift registers 624 and inverters 626 to invert and/or shift the fractional value XF, thereby producing the addends ADD1, ADD2, ADD3 described above.

In one embodiment, the addition of the addends generated by the addend generation logic 620 may be performed with a 4:2 compressor 630 which compresses the four addends into a sum and carry vector and then uses the adder and leading zero anticipator 606 (via multiplexer 632) to add the final two values. Optionally, the adder may be implemented separately in the addend generation logic 620, for example, to improve timing of the addition operation. In some cases, as known to those skilled in the art, the 4:2 compressor 630 may also be simplified to a Boolean equivalent version based on the constants (e.g., ADD4) involved in the addition.

After the sum of the addends ADD1, ADD2, ADD3, ADD4 is obtained, the sum may be sent to the normalizer 608 to be normalized into a correct floating point value, for example, using information from the adder and leading zero anticipator 606. The normalized sum may then be sent to the round and result logic 610 for any rounding and/or to force any special case constants (e.g., if the input is zero, then the round and result logic may output a one for a cosine function and a zero for a sine function). The trigonometric result may then be provided as an output from the floating point unit 224, for example, to be used in other calculations. Thus, as described above, the trigonometric value may be used, for example, during rendering operations for pixel shading, vertex shading, and/or generating procedural textures. The trigonometric value may also be used to perform physics calculations. Results of the rendering operations and/or physics calculations may then be displayed as a rendered image to a user, for example, using display 142.

Figure 7:
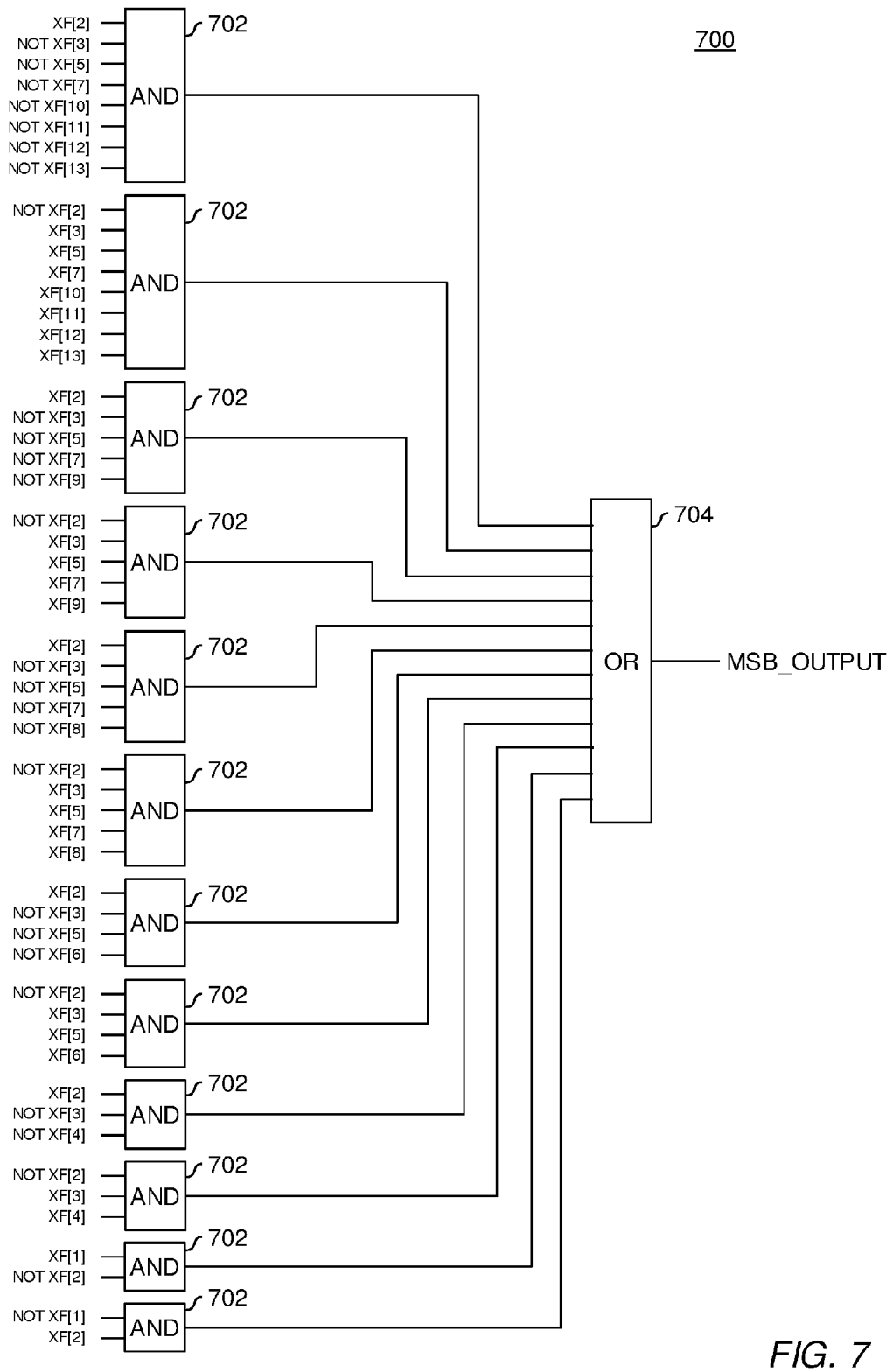
FIG. 7 is a block diagram depicting a combinational logic configured to produce the most significant bit of the trigonometric value according to one embodiment of the invention.

In one embodiment, to provide increased execution performance with respect to generating the trigonometric value, one or more of the bits of the trigonometric value may be generated using combinational logic (e.g., as opposed to generating the trigonometric value completely using an adder). FIG. 7 is a block diagram depicting exemplary combinational logic 700 configured to produce, for example, the most significant bit (MSB_OUTPUT) of the trigonometric value using AND gates 702 and OR gate 704. Increased performance may be provided by the combinational logic 700, for example, because the size of the adder used to generate the trigonometric value may be reduced, thereby reducing the number of carry additions (e.g., which typically propagate through the entire length of the adder) which are performed. Thus, as depicted, the combinational logic 700 may not use a carry addend to produce the one or more bits of the trigonometric value generated by the combinational logic 700. While described with respect to combinational logic configured to produce the most significant bit of the trigonometric value, embodiments of the invention may also be utilized where additional bits of the trigonometric value are generated by combinational logic.

While the foregoing is directed to embodiments of the present invention, other and further embodiments of the invention may be devised without departing from the basic scope thereof, and the scope thereof is determined by the claims that follow.

What is claimed is:

1. A computer-implemented method for generating a trigonometric value, comprising:
   receiving, by operation of one or more computer processors, a request to calculate a trigonometric value for an angle value;
   calculating, by operation of a multiplier circuit, a fractional value from the angle value, wherein the fractional value corresponds to one of a first quadrant value, a second quadrant value, a third quadrant value, and a fourth quadrant value;
   using, by operation of the one or more computer processors, the fractional value to determine whether to perform at least one of inverting the fractional value and negating the trigonometric value;
   generating, by operation of a multi-input adder, the trigonometric value from the fractional value by adding at least a portion of the fractional value with at least one of a shifted fractional value produced by shifting the portion of the fractional value and a constant value; and
   providing, by operation of the one or more computer processors, the trigonometric value in response to the request.

2. The method of claim 1, wherein calculating the fractional value from the angle value comprises dividing the angle value by a value of two multiplied by pi.

3. The method of claim 1, wherein, if the fractional value corresponds to one of the first quadrant value and the third quadrant value, the fractional value is not inverted, and wherein, if the fractional value corresponds to one of the second quadrant value and the fourth quadrant value, the fractional value is inverted.

4. The method of claim 1, wherein if the fractional value corresponds to one of the first quadrant value and the fourth quadrant value, the trigonometric value is not negated, and wherein, if the fractional value corresponds to one of the second quadrant value and the third quadrant value, the fractional value is inverted.

5. The method of claim 1, wherein generating the trigonometric value from the fractional value comprises:
adding the portion of the fractional value to the shifted fractional value and a first constant value if a second portion of the fractional value corresponds to a first predefined value; and
adding the portion of the fractional value to the shifted fractional value and a second constant value if the second portion of the fractional value corresponds to a second predefined value.

6. The method of claim 1, wherein generating the trigonometric value from the fractional value comprises:
adding the portion of the fractional value to the shifted fractional value without adding any constant value to the fractional value if a second portion of the fractional value corresponds to a first predefined value; and
adding the portion of the fractional value to the constant value without adding any shifted fractional value to the portion of the fractional value if the second portion of the fractional value corresponds to a second predefined value.

7. The method of claim 1, wherein the most significant bit of the trigonometric value is generated from combinational logic which does not include an adder.

8. A computer-readable storage medium including instructions, which, when executed by a processor, are configured to perform an operation comprising:
receiving a request to calculate a trigonometric value for an angle value;
calculating a fractional value from the angle value, wherein the fractional value corresponds to one of a first quadrant value, a second quadrant value, a third quadrant value, and a fourth quadrant value;
using the fractional value to determine whether to perform at least one of inverting the fractional value and negating the trigonometric value;
generating the trigonometric value from the fractional value by adding at least a portion of the fractional value with at least one of a shifted fractional value produced by shifting the portion of the fractional value and a constant value; and
providing the trigonometric value in response to the request.

9. The computer-readable storage medium of claim 8, wherein calculating the fractional value from the angle value comprises dividing the angle value by a value of two multiplied by pi.

10. The computer-readable storage medium of claim 8, wherein, if the fractional value corresponds to one of the first quadrant value and the third quadrant value, the fractional value is not inverted, and wherein, if the fractional value corresponds to one of the second quadrant value and the fourth quadrant value, the fractional value is inverted.

11. The computer-readable storage medium of claim 8, wherein if the fractional value corresponds to one of the first quadrant value and the fourth quadrant value, the trigonometric value is not negated, and wherein, if the fractional value corresponds to one of the second quadrant value and the third quadrant value, the fractional value is inverted.

12. The computer-readable storage medium of claim 8, wherein generating the trigonometric value from the fractional value comprises:
adding the portion of the fractional value to the shifted fractional value and a first constant value if a second portion of the fractional value corresponds to a first predefined value; and
adding the portion of the fractional value to the shifted fractional value and a second constant value if the second portion of the fractional value corresponds to a second predefined value.

13. The computer-readable storage medium of claim 8, wherein generating the trigonometric value from the fractional value comprises:
adding the portion of the fractional value to the shifted fractional value without adding any constant value to the fractional value if a second portion of the fractional value corresponds to a first predefined value; and
adding the portion of the fractional value to the constant value without adding any shifted fractional value to the portion of the fractional value if the second portion of the fractional value corresponds to a second predefined value.

14. The computer-readable storage medium of claim 8, wherein the most significant bit of the trigonometric value is generated from combinational logic which does not include an adder.

15. A computer system comprising:
a computer-readable storage medium including one or more instructions;
a processor comprising circuitry, which, when executing the one or more instructions, is configured to:
receive a request to calculate a trigonometric value for an angle value;
calculate a fractional value from the angle value, wherein the fractional value corresponds to one of a first quadrant value, a second quadrant value, a third quadrant value, and a fourth quadrant value;
use the fractional value to determine whether to perform at least one of inverting the fractional value and negating the trigonometric value;
generate the trigonometric value from the fractional value by adding at least a portion of the fractional value with at least one of a shifted fractional value produced by shifting the portion of the fractional value and a constant value; and
provide the trigonometric value in response to the request.

16. The computer system of claim 15, wherein calculating the fractional value from the angle value comprises dividing the angle value by a value of two multiplied by pi.

17. The computer system of claim 15, wherein, if the fractional value corresponds to one of the first quadrant value and the third quadrant value, the fractional value is not inverted, and wherein, if the fractional value corresponds to one of the second quadrant value and the fourth quadrant value, the fractional value is inverted.

18. The computer system of claim 15, wherein if the fractional value corresponds to one of the first quadrant value and the fourth quadrant value, the trigonometric value is not negated, and wherein, if the fractional value corresponds to one of the second quadrant value and the third quadrant value, the fractional value is inverted.

19. The computer system of claim 15, wherein generating the trigonometric value from the fractional value comprises:

adding the portion of the fractional value to the shifted fractional value and a first constant value if a second portion of the fractional value corresponds to a first predefined value; and adding the portion of the fractional value to the shifted fractional value and a second constant value if the second portion of the fractional value corresponds to a second predefined value.

20. The computer system of claim 15, wherein generating the trigonometric value from the fractional value comprises:

adding the portion of the fractional value to the shifted fractional value without adding any constant value to the fractional value if a second portion of the fractional value corresponds to a first predefined value; and adding the portion of the fractional value to the constant value without adding any shifted fractional value to the portion of the fractional value if the second portion of the fractional value corresponds to a second predefined value.

21. The computer system of claim 15, wherein the most significant bit of the trigonometric value is generated from combinational logic which does not include an adder.

* * * * *